United States Patent
Liu et al.

(10) Patent No.: US 10,160,448 B2
(45) Date of Patent: Dec. 25, 2018

(54) OBJECT TRACKING USING SENSOR FUSION WITHIN A PROBABILISTIC FRAMEWORK

(71) Applicant: Ford Global Technologies, LLC, Dearborn, MI (US)

(72) Inventors: Dongran Liu, San Jose, CA (US); Sneha Kadetotad, Cupertino, CA (US); Marcos Paul Gerardo Castro, Mountain View, CA (US); Jinesh J. Jain, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 22 days.

(21) Appl. No.: 15/346,210

(22) Filed: Nov. 8, 2016

(65) Prior Publication Data
US 2018/0126984 A1    May 10, 2018

(51) Int. Cl.
*B60W 30/09* (2012.01)
*B60W 10/04* (2006.01)
*B60W 10/18* (2012.01)
*B60W 10/20* (2006.01)

(52) U.S. Cl.
CPC ............ *B60W 30/09* (2013.01); *B60W 10/04* (2013.01); *B60W 10/18* (2013.01); *B60W 10/20* (2013.01)

(58) Field of Classification Search
CPC ...... B60W 30/09; B60W 10/04; B60W 10/18; B60W 10/20
See application file for complete search history.

(56) References Cited

U.S. PATENT DOCUMENTS

| | | |
|---|---|---|
| 7,266,477 B2 | 9/2007 | Foessel |
| 8,527,445 B2 | 9/2013 | Karlns |
| 8,705,797 B2 | 4/2014 | Zeng |
| 8,954,272 B2 | 2/2015 | Adam |
| 9,129,211 B2 | 9/2015 | Zeng |
| 9,255,989 B2 | 2/2016 | Joshi |

(Continued)

FOREIGN PATENT DOCUMENTS

| | | |
|---|---|---|
| CN | 105372654 A | 3/2016 |
| DE | 102009006214 A1 | 7/2010 |

OTHER PUBLICATIONS

Aeberhard et al., Object Existence Probability Fusion using Dempster-Shafer Theory in a High-Level Sensor Data Fusion Architecture, Jun. 2011, IEEE, pp. 770-775. (Year: 2011).*

*Primary Examiner* — Aaron L Troost
(74) *Attorney, Agent, or Firm* — David R. Stevens; Stevens Law Group (57) ABSTRACT

A controller receives outputs form a plurality of sensors such as a camera, LIDAR sensor, RADAR sensor, and ultrasound sensor. Sensor outputs corresponding to an object are assigned to a tracklet. Subsequent outputs by any of the sensors corresponding to that object are also assigned to the tracklet. A trajectory of the object is calculated from the sensor outputs assigned to the tracklet, such as by means of Kalman filtering. For each sensor output assigned to the tracklet, a probability is updated, such as using a Bayesian probability update. When the probability meets a threshold condition, the object is determined to be present and an alert is generated or autonomous obstacle avoidance is performed with respect to an expected location of the object.

13 Claims, 6 Drawing Sheets

(56) References Cited

U.S. PATENT DOCUMENTS

2015/0112570 A1* 4/2015 Schmudderich ...... B60W 40/04
                                                      701/93
2016/0103213 A1* 4/2016 Ikram .................... G01S 13/42
                                                      342/105
2017/0185850 A1* 6/2017 Hsu .................... G06K 9/00805

* cited by examiner

OBJECT TRACKING USING SENSOR FUSION WITHIN A PROBABILISTIC FRAMEWORK

BACKGROUND

Field of the Invention

This invention relates to performing obstacle detection, such as for use in autonomous vehicles.

Background of the Invention

Most active and passive safety features available in vehicles today rely heavily on sensors (ultrasonic, camera, RADAR, etc.) to accurately detect, classify and track objects in dynamic environments. Most active features like emergency brake assist, forward collision assist, etc., aim to brake on solid objects (e.g. walls, poles, pedestrians, cars), which would potentially cause injury or property damage.

Sensor data has several issues such as being noisy, sparse, and inaccurate. In addition to this, 'ghost objects' tend to appear in different scenarios. These data imperfections can cause unnecessary intervention by active safety features and inconvenience by passive safety features repeatedly alerting the driver. The ability to discriminate obstacles and detect them accurately across time in these scenarios is imperative to ensuring a comfortable experience to a user of the vehicle.

The systems and methods disclosed herein provide an improved approach for obstacle detection using sensor data.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
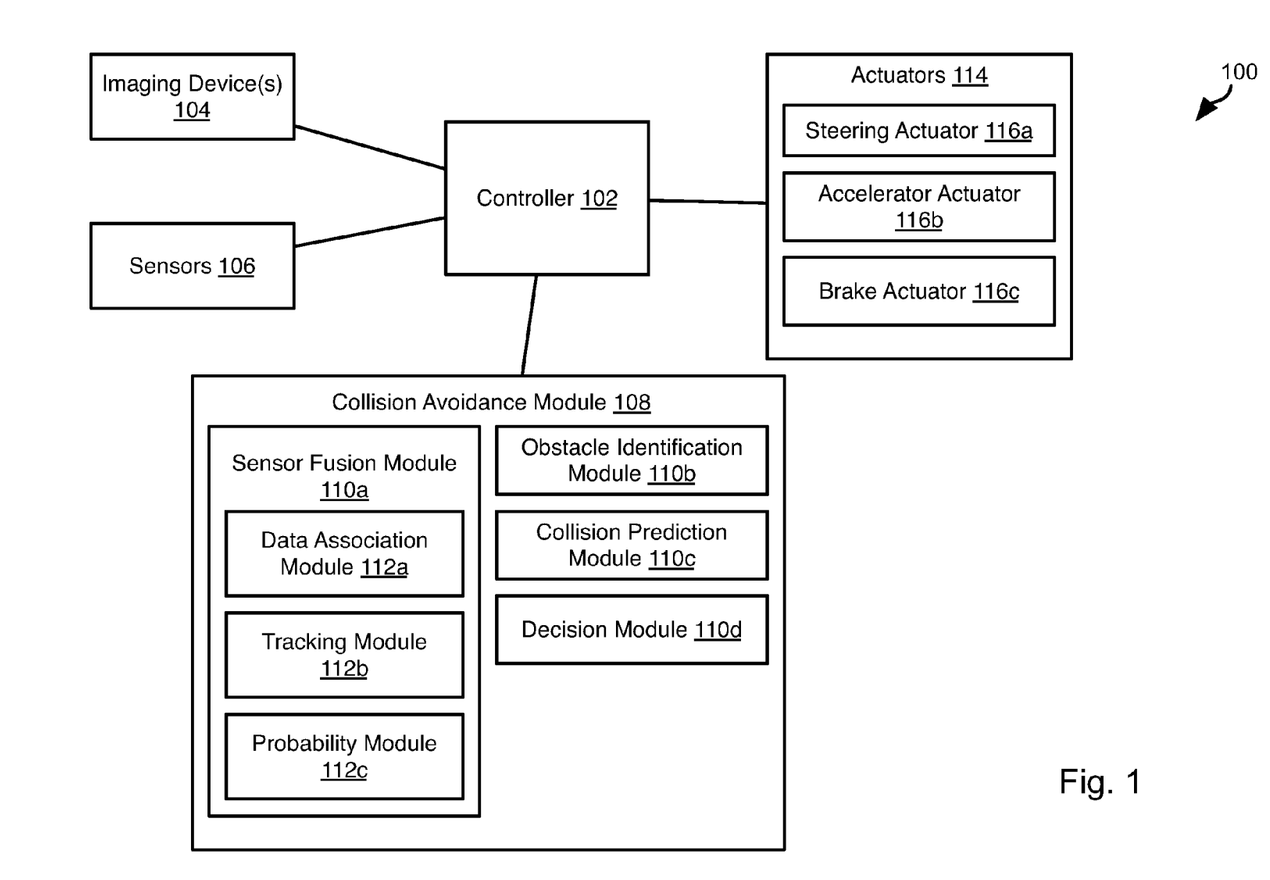
FIG. 1 is a schematic block diagram of a system for implementing embodiments of the invention.

Referring to FIG. 1, a system 100 may include a controller 102 housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. The controller 102 may receive one or more image streams from one or more imaging devices 104. For example, one or more cameras may be mounted to the vehicle and output image streams received by the controller 102. The controller 102 may receive one or more data streams from one or more sensors 106. For example, the controller may be coupled to one or more other sensors 106 that are mounted to the vehicle. The sensors may include RADAR (radio distancing and ranging) sensors, LIDAR (light distancing and ranging) sensors, SONAR (sound navigation and ranging) sensors, ultrasonic sensors, and the like.

The imaging devices 104 and other sensors 106 detect the environment by a plurality of different modalities and provide many ways to detect the same object. The systems and methods disclosed herein provide a way in which the outputs of the imaging devices 104 and other sensors 106 may be fused to detect potential obstacles with greater certainty and avoiding false positives due to sensor noise.

A collision avoidance module 108 may include a sensor fusion module 110a. The sensor fusion module 110a may include a data association module 112a that is programmed to associate features in the outputs of the imaging devices 104 and other sensor 106 with "tracklets." Each tracklet includes data, or a representation of data, corresponding to an object, where the data is obtained from outputs of the imaging devices 104 and other sensors 106. As described below, a tracklet may include a trajectory of the object and a probability that an object is actually present at a location indicated by the tracklet. The data association module 112a creates tracklets in response to initial detection of an object and updates the tracklet in response to subsequent sensing of the object. The association of sensor data to tracklets is described in greater detail below with respect to FIGS. 4 and 6.

The sensor fusion module 110a may include a tracking module 112b. The tracking module 112b determines a trajectory of each tracklet according to the sensor data assigned to it. In particular, the tracking module 112b may implement a Kalman filter that estimates a trajectory of an object represented by a tracklet by removing sensor noise.

The sensor fusion module 110a may include a probability module 112c. Each time an object is sensed in the output of any of the imaging devices 104 or sensors 106, the tracklet is updated as described above. In some embodiments a probability may also be update by the probability module 112c such that each time the object is sensed, the probability is increased. The probability indicates a likelihood that an object is in fact present at a location indicated by the tracklet. The probability may be computed according to a Bayesian statistical model and updated with each sensing of the object according to a Bayesian probability update technique. The updating of the probability may be performed according to the approach described below with respect to FIG. 4.

The collision avoidance module 108 may further include an obstacle identification module 110b, a collision prediction module 110c, and a decision module 110d. The obstacle identification module 110b analyzes the one or more image streams and identifies potential obstacles, including people, animals, vehicles, buildings, curbs, and other objects and structures. In particular, the obstacle identification module 110b may identify vehicle images in the image stream. The obstacle identification module 110*b* may identify obstacles as indicated by the tracklets created and updated by the sensor fusion module. For example, tracklets having a probability exceeding a threshold may be determined to be actual obstacles by the obstacle identification module 110*b*.

The collision prediction module 110*c* predicts which obstacles are likely to collide with the vehicle based on its current trajectory or current intended path and the trajectory of the obstacles. The decision module 110*d* may make a decision to stop, accelerate, turn, etc. in order to avoid obstacles. The manner in which the collision prediction module 110*c* predicts potential collisions and the manner in which the decision module 110*d* takes action to avoid potential collisions may be according to any method or system known in the art of autonomous vehicles.

The decision module 110*d* may control the trajectory of the vehicle by actuating one or more actuators 114 controlling the direction and speed of the vehicle. For example, the actuators 114 may include a steering actuator 116*a*, an accelerator actuator 116*b*, and a brake actuator 116*c*. The configuration of the actuators 116*a*-116*c* may be according to any implementation of such actuators known in the art of autonomous vehicles.

Note that although the methods described herein are described for use in an autonomous vehicle, a human-driven vehicle may still benefit from the identification of obstacles according to the methods described herein.

Figure 2:
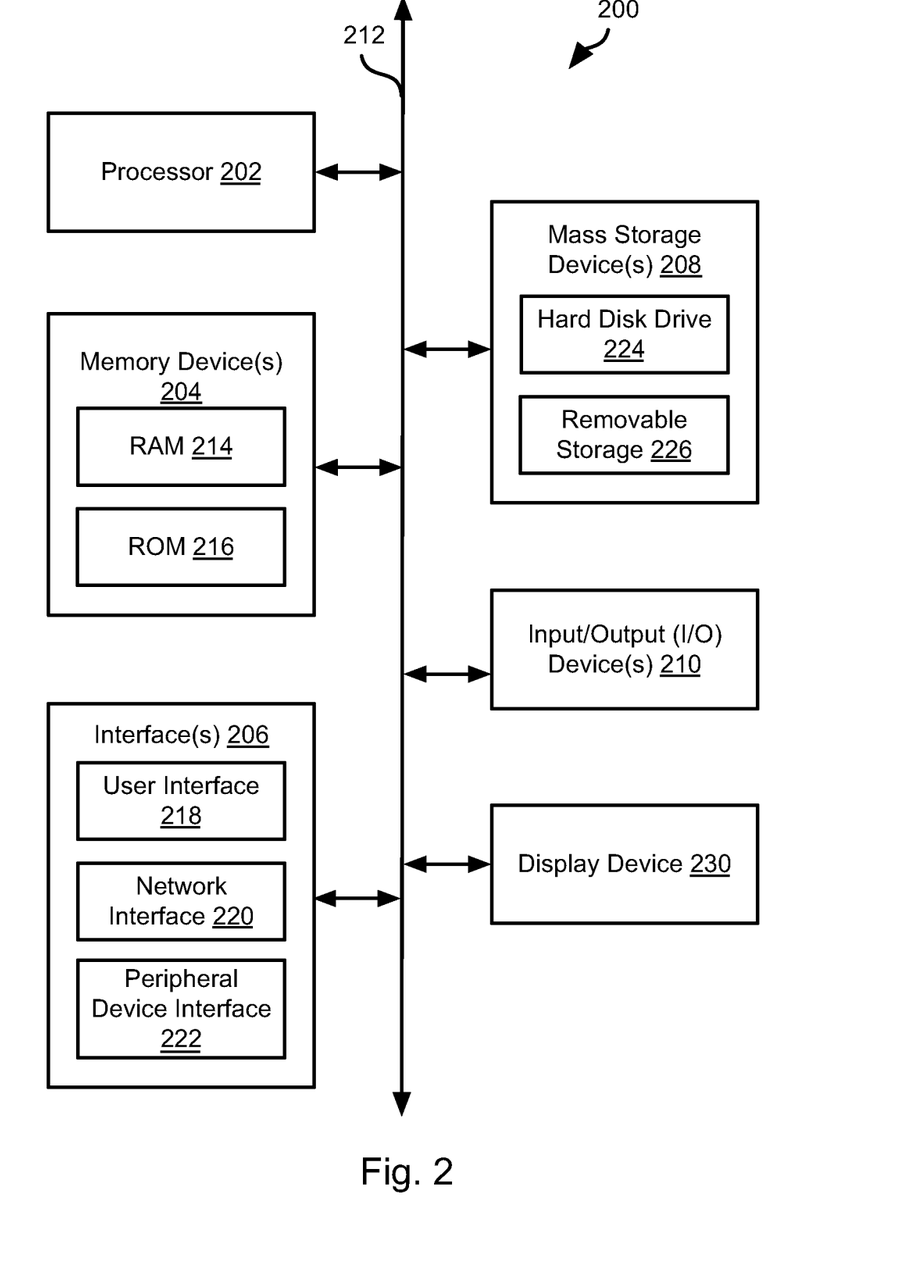
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
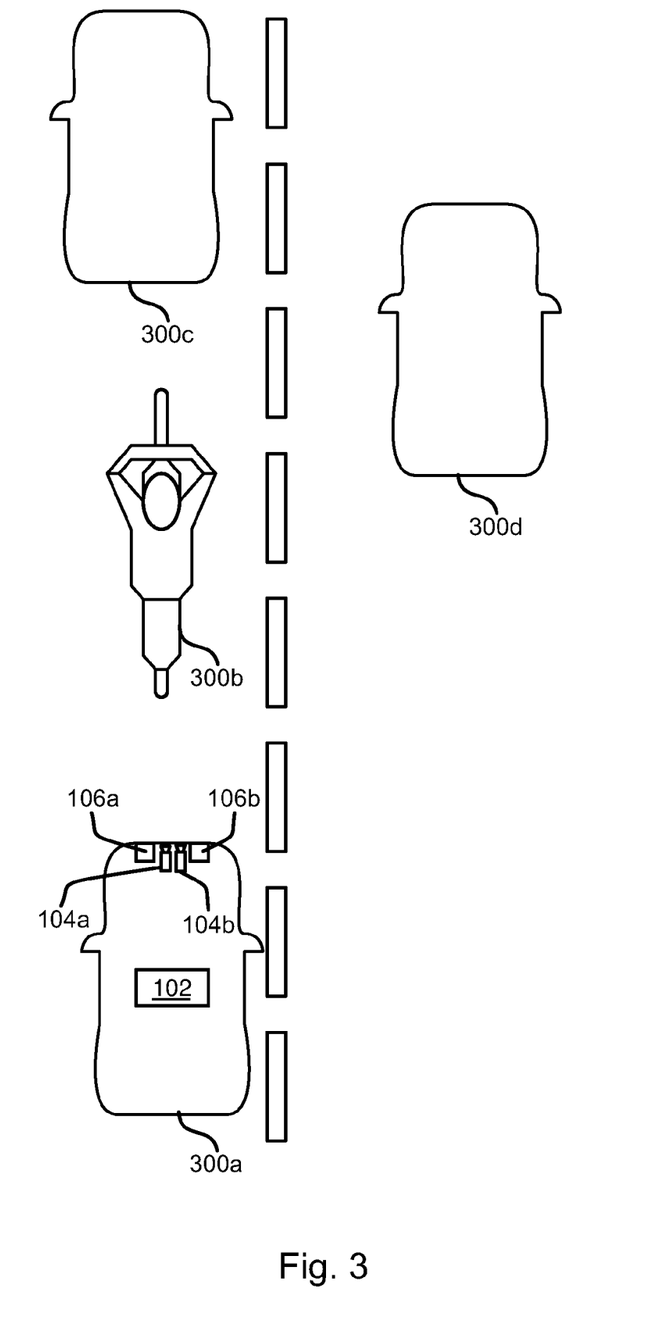
FIG. 3 is a schematic diagram illustrating a vehicle incorporating sensors in traffic.

Turning now to FIG. 3, vehicles 300*a*-300*d* in multi-lane traffic may travel in lanes in the same or opposite directions. Other obstacles such as pedestrians, animals, signs, debris, and the like may also be present.

The vehicle 300*a* housing the controller 102 may have forward facing sensors 106*a*, 106*b*, such as a LIDAR, RADAR, ultrasonic, or other sensor. The vehicle 300 may further include forward facing cameras 104*a*, 104*b*. The forward facing cameras 104*a*, 104*b* may implement binocular vision such that the three-dimensional location of objects may be determined from the outputs of the cameras 104*a*, 104*b*. The outputs of the sensors 106*a*, 106*b* may also be in the form of three-dimensional data, such as in the form of a point cloud wherein each point indicating a location at which material was detected. Other sensors may detect objects in lateral or rearward regions of the vehicle 300*a*.

The outputs of the cameras 104*a*, 104*b* and sensors 106*a*, 106*b* include three dimensional models of surroundings of the vehicle 300*a*. These models will include features representing objects (e.g., the other vehicles 300*b*-300*d*) that are in the field of view of the cameras 104*a*, 104*b* and sensors 106*a*, 106*b*. Each of these features will be assigned to a tracklet that is updated each time that feature is detected.

Figure 4:
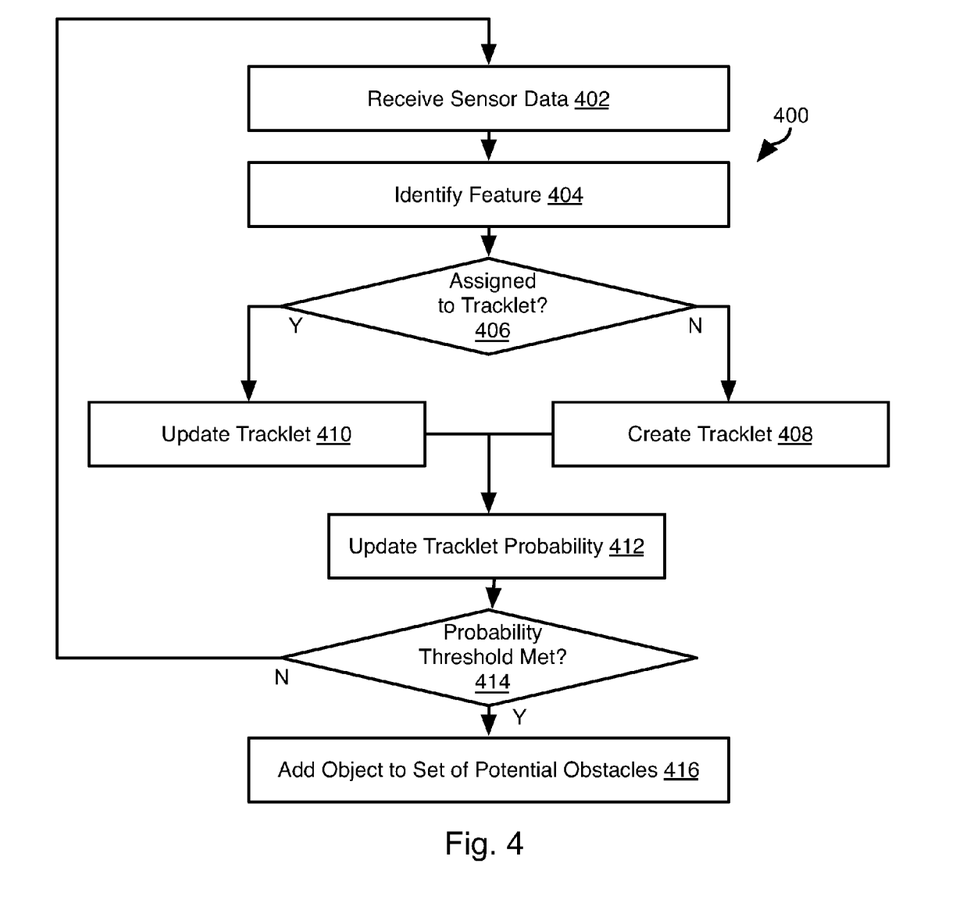
FIG. 4 is a process flow diagram of a method for tracking objects using sensor outputs in accordance with an embodiment of the present invention.

FIG. 4 illustrates a method 400 by which tracklets are created and updated by the controller 102. The method 400 may include receiving 402 sensor data. Receiving 402 sensor data may include receiving data from an individual sensors 104*a*, 104*b*, 106*a*, 106*b*. For example, the method 400 may be executed for each frame of data received from any of the sensors 104*a*, 104*b*, 106*a*, 106*b*. Alternatively, frames of data received from multiple sensors 104*a*, 104*b*, 106*a*, 106*b* may be processed simultaneously according to the method 400. In some embodiments, the sensors 104*a*, 104*b*, 106*a*, 106*b* may have different frame rates such that separate processing is performed.

The method 400 may include identifying 404 features in the sensor data. Step 404 may include any technique for identifying objects in sensor data as known in the art. Step 404 may include identifying features in the sensor data that are consistent with presence of objects such as vehicles, people, animals, signs, buildings, or any other object that may be present.

The output of step 404 may be a listing of data objects that each represent a detected feature. The data objects may include a location, e.g. a coordinate of a center, of the feature, an extent of the feature, a total volume or facing area or the size or vertex locations of a bounding box or cube, or other data. There are various sensors 104a, 104b, 106a, 106b by which objects are detected and each may define its own coordinate system. Accordingly, the location data of step 404 may be translated from the coordinate system of the sensor in which the feature was detected into a common coordinate system, such as a coordinate system of one of the sensors 104a, 104b, 106a, 106b that is designated as the common coordinate system. The translation may be determined by a calibration step wherein objects at known locations are detected using the various sensors 104a, 104b, 106a, 106b and the sensor outputs evaluated to map sensor outputs to the common coordinate system.

The method 400 may include evaluating 406 whether the feature has been assigned to an existing tracklet. Each tracklet may be a data object that contains some or all of the data of the features identified at step 404, e.g. a location and extent. The tracklet may further include a trajectory. Accordingly, step 406 may include determining whether a feature has a location and extent corresponding to an existing tracklet, e.g. within some tolerance values of the location and extent of the location and extent of an existing tracklet. A tracklet may include a trajectory such that a predicted location of the object may be determined from the trajectory. Accordingly, step 406 may include determining whether the size and extent of the feature correspond to the extent and predicted location of an existing tracklet, e.g. within some tolerances of these values.

If not, then a tracklet may be created 408. In some embodiments, a tracklet is created for a detected feature only if certain conditions are met, such as repeated detection of the feature for a minimum number of data frames and/or behavior consistent with a real object. For example, step 408 may be performed by executing the method 500 of FIG. 5, which may include refraining from creating a tracklet in some circumstances.

If a corresponding tracklet is found 406 to exist, then the method 400 may include updating 410 that tracklet. For example, the location and extent of the feature identified at step 404 may be added to the tracklet as the most recent location and extent measured. Updating 410 may include adding the data from the data object of step 404 to the tracklet and performing Kalman filtering with respect to the data from step 404 and from step 404 for previous iterations of the method 400. As known in the art, Kalman filtering may be used for object tracking using various sensor outputs in order to remove sensor noise and provide an estimate of an object's trajectory.

The method 400 may include updating 412 the probability of the tracklet that is updated at step 410 or created at step 408. In some embodiments, updating 412 may include processing the features identified at step 404 according to a Bayesian statistical model wherein each sensor output is processed to determine an impact on a probability that an object represented by the tracklet exists. For an existing tracklet, step 412 may include performing a Bayesian probability update using the feature identified at step 404.

In some embodiments, updating 412 the tracklet probability may include updating the probability such that only the number of times the object represented by the tracklet is identified determined the probability. In other embodiments, other data may be incorporated into the statistical model, such as the variance of the sensor in which the feature of step 404 was identified, the variation of the location data with respect to a Kalman filtered trajectory, or other factors. In some embodiments, distance to a feature may be a factor in updating 412 the probability, such that the probability is increased more for features that are closer to the vehicle 300a as compared to features that are farther away from the vehicle 300a.

The probability updating step 412 enables the fusion of outputs of multiple sensors in that each time the object corresponding to a tracklet is detected by any sensor, the probability will increase. Accordingly, the location of an object may be confirmed using various sensors having different sensing modalities in order to avoid false positives due to noise in the output of a single sensor or type of sensor.

If the probability as updated at step 412 is found 414 to meet some threshold confidence level, then one or more actions may be taken. For example, an object at the location and having the trajectory recorded in the tracklet may be added 416 to a set of potential obstacles and collision avoidance may be performed with respect to this set of obstacles.

In some embodiments, an alert to a driver may be generated if the trajectory of the vehicle 300a and the object indicate collision will occur absent a change in bearing. This is particularly useful where the vehicle 300a is not an autonomous vehicle or is operating semi-autonomously with the possibility of human intervention.

Figure 5:
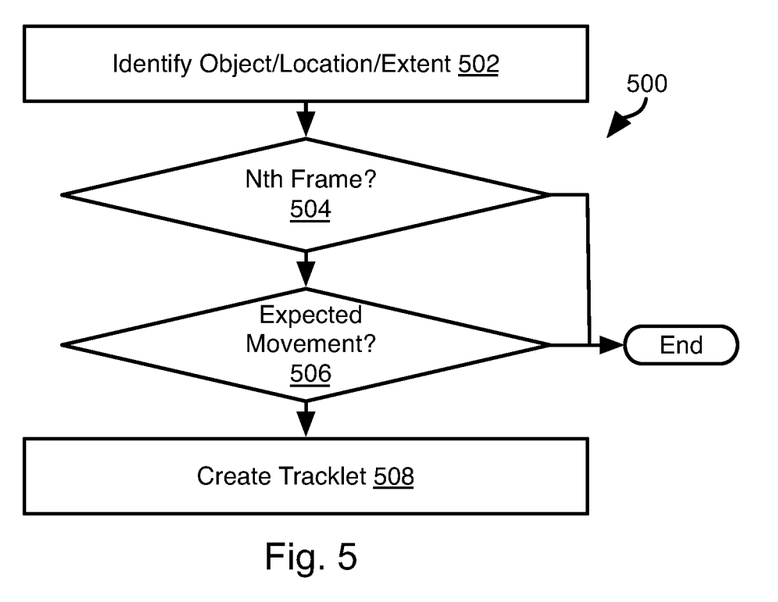
FIG. 5 is a process flow diagram of a method for determining whether a sensor output shall be assigned to a tracklet.

Referring to FIG. 5, the illustrated method 500 may be executed at step 408 of the method 400 in order to determine whether to create a tracklet for a feature detected in the output of one or more sensors.

The method 500 may include identifying 502 properties of the feature from the sensor data, such as its location, extent, shape, or the like. The method 500 may further include determining whether the feature is the Nth occurrence of this feature in a set of N contiguous sensor frames, where N is an integer, such as an integer from 10 to 30, preferably 20. The sensor frames may represent a set of data obtained from a particular sensor 104a, 104b, 106a, 106b. The N sensor frames may be sensor frames from the same sensor or from multiple sensors having different sensing modalities. Whether the feature is present in the N contiguous frames may include determining that a feature having the properties of step 502 (extent, location, shape, etc.) was present in the N contiguous frames.

The method 500 may further include evaluating 504 whether the variation in the location of the feature in the N contiguous frames is consistent with a real object. An object may be moving, accordingly, whether the N contiguous frames include features likely corresponding to the same object may include determining 506 that features having a consistent location and/or shape are present in the N frames and exhibit a change in location between frames that is consistent with a real trajectory, e.g. having a speed, acceleration, turning radius, etc. corresponding to a real object.

If the conditions of steps 504 and 506 are found to be met, a tracklet may be created 508 that includes the data, or values derived from the data, included in the features of the N contiguous frames. If not, the method 500 may end without creating a tracklet for the feature. A tracklet may be created in subsequent iterations of the method 500 provided the conditions of one or both of steps 504 and 506 are subsequently met.

Figure 6:
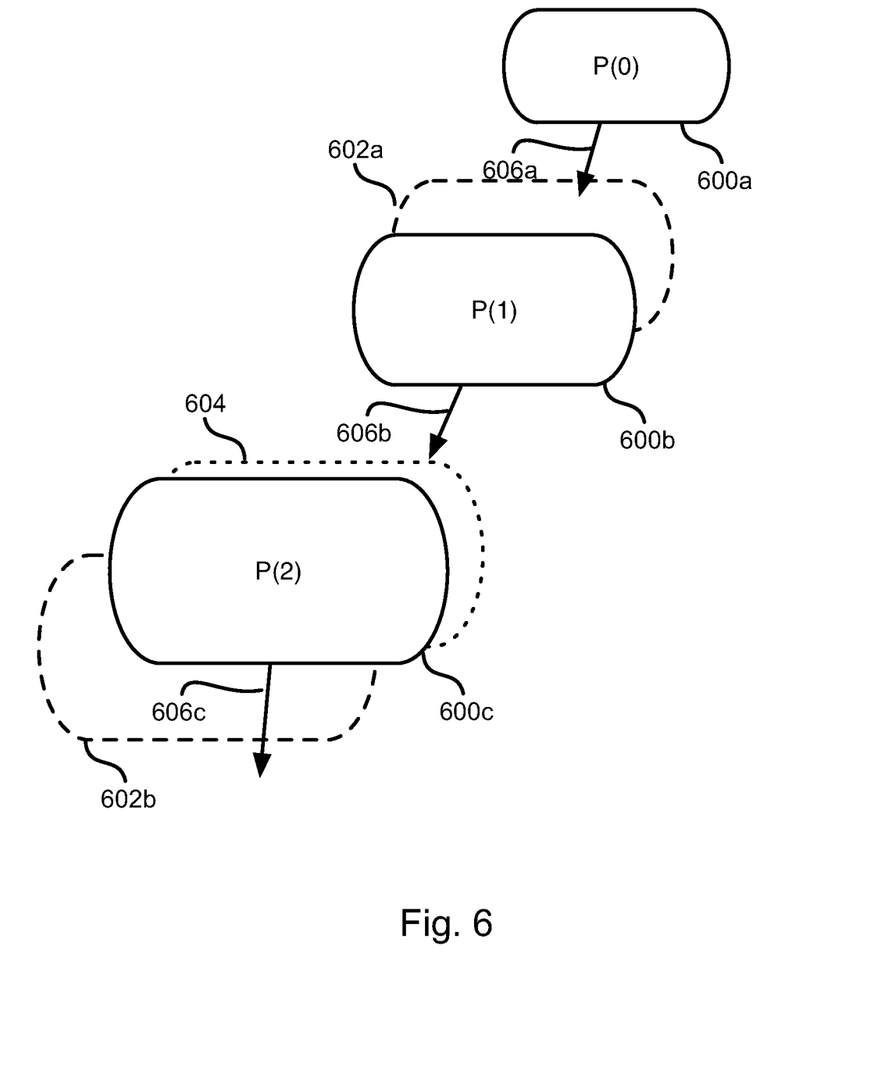
FIG. 6 illustrates the progression of a tracklet as identified in accordance with an embodiment of the present invention.

Referring to FIG. 6, the illustrated diagram illustrates the change in a tracklet over time. Features 600a-600c represent features detected in the output of one sensor, features 602a, 602b represent features detected in the output of a second sensor, and feature 604 represents a feature detected in the output of a third sensor. The first, second, and third sensors may be different types of sensors with different sensing modalities, e.g. a lens-based camera, LIDAR sensor, RADAR sensor, ultrasonic sensor and the like.

Upon detecting feature 600a, a tracklet may be created, such as in response to executing the method 500. An initial probability P(0) is calculated indicating a confidence that the object in fact exists based on the feature 600a being found in the sensor output.

At a subsequent point in time, features 600b and 602a are detected and determined to belong to the same tracklet as feature 600a, such as due to lying on a trajectory 606a for feature 600a, having a within-tolerance distance to feature 600a, having a same extent and/or shape as the feature 600a, or some other criteria.

An updated trajectory 606b for the tracklet may be calculated based on the feature 600a and the newer features 600b, 602a. As noted above, the trajectory 606b may be calculated by Kalman filtering these features 600a, 600b, 602a.

An updated probability P(1) is calculated that indicates the confidence that the tracklet represents a real object in view of the features 600a, 600b, and 602a. As noted above, this may include performing a Bayesian probability update based on the features 600b, 602a.

At a later point in time, features 600c, 602b, and 604 are detected and associated with the tracklet. Another updated trajectory 606c is calculated as described above and an updated probability P(2) is calculated based on the most recent features 600c, 602b, 604. At some point, the probability, P(2) becomes large enough that the object is determined to be real. Accordingly, the vehicle controller 102 may perform obstacle avoidance with respect to the object.

In the example of FIG. 6, when an object is first detected at a large distance away, there are few features corresponding to the object. As the object draws closer, more and more features are detected and used to update the tracklet. The probability therefore aggregates the effect of these features over time such that as the object becomes a potential danger, the probability will exceed the threshold and obstacle avoidance can be performed.

In contrast, features that are not associated to a tracklet along with many features over time from multiple sensors will not exceed the threshold and will be ignored. This will include features corresponding to objects that do not approach the vehicle 300a and detected features that are the result of sensor noise rather than an actual object.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising performing, by a vehicle controller:
   providing a plurality of sensors in data communication with the vehicle controller;
   receiving, from the plurality of sensors, a plurality of sensor outputs;
   detecting a first feature in a first output of the plurality of outputs received from a first sensor of the plurality of sensors;
   creating a tracklet corresponding to the first feature, the tracklet having a location and a trajectory determined according to the first output;
   detecting a second feature in a second output of the plurality of outputs received from a second sensor of the plurality of sensors;
   (a) determining that a second location of the second feature determined according to the second output corresponds to the location and the trajectory of the tracklet;
   in response to (a) updating the location and the trajectory of the tracklet according to the second output and increasing a probability associated with the tracklet according to the second output;
   detecting a third feature in a third output of the plurality of outputs received from the first sensor of the plurality of sensors after receiving the first output from the first sensor;
   (b) determining that a third location of the third feature determined according to the third output corresponds to the location and the trajectory of the tracklet;
   in response to (b) updating the location and the trajectory of the tracklet according to the third output and increasing the probability associated with the tracklet according to the third output;
   determining that the probability is sufficiently high to perform collision avoidance with respect to the tracklet; and
   actuating at least one of a steering actuator, an accelerator actuator, and a brake actuator effective to avoid the object in response to determining that the probability is sufficiently high to perform collision avoidance with respect to the tracklet.

2. The method of claim 1, wherein the plurality of different sensing modalities include at least two of a two-dimensional camera image, radio distancing and ranging (RADAR), light distancing and ranging (LIDAR), and ultrasound.

3. The method of claim 1, further comprising determining the trajectory for the tracklet by performing Kalman filtering with respect to the first feature, second feature, and third feature.

4. The method of claim 1, wherein increasing the probability associated with the tracklet comprises performing a Bayesian probability update for the first feature, the second feature, and the third feature.

5. The method of claim 1, further comprising:
   creating the tracklet in response to detecting a minimum number of contiguous sensor outputs of the plurality of sensor outputs indicating presence of an object.

6. The method of claim 1, further comprising:
   creating the tracklet in response to both of (a) detecting a minimum number of contiguous sensor outputs of the plurality of sensor outputs indicating presence of an object and (b) the minimum number of contiguous sensor outputs indicating movement of the object that is consistent with expected object behavior.

7. A system comprising:

a plurality of sensors having a plurality of sensing modalities;

a vehicle controller operably coupled to the plurality of sensors, the vehicle controller programmed to— receive, from the plurality of sensors, a plurality of sensor outputs;

detect a first feature in a first output of the plurality of outputs received from a first sensor of the plurality of sensors;

create a tracklet corresponding to the first feature, the tracklet having a location and a trajectory determined according to the first output;

detect a second feature in a second output of the plurality of outputs received from a second sensor of the plurality of sensors;

if (a) a second location of the second feature determined according to the second output corresponds to the location and the trajectory of the tracklet, update the location and the trajectory of the tracklet according to the second output and increase a probability associated with the tracklet according to the second output;

detect a third feature in a third output of the plurality of outputs received from the first sensor of the plurality of sensors after receiving the first output from the first sensor;

if (b) a third location of the third feature determined according to the third output corresponds to the location and the trajectory of the tracklet, update the location and the trajectory of the tracklet according to the third output and increase the probability associated with the tracklet according to the third output; and if the probability associated with the tracklet meets a threshold condition, determine that an object is present.

8. The system of claim 7, wherein the plurality of sensors include at least two of a two-dimensional camera, a radio distancing and ranging (RADAR) sensor, a light distancing and ranging (LIDAR) sensor, and an ultrasonic sensor.

9. The system of claim 7, wherein the vehicle controller is further programmed to determine the trajectory for the tracklet by performing Kalman filtering with respect to features assigned to the tracklet.

10. The system of claim 7, wherein the vehicle controller is further programmed to update the probability by performing a Bayesian probability update for the first feature, the second feature, and the third feature assigned to the tracklet.

11. The system of claim 7, wherein the vehicle controller is further programmed to create the tracklet in response to detecting a minimum number of contiguous sensor outputs of the plurality of sensor outputs indicating presence of an object.

12. The system of claim 7, wherein the vehicle controller is further programmed to create the tracklet in response to both of (a) detecting a minimum number of contiguous sensor outputs of the plurality of sensor outputs indicating presence of the object and (b) the minimum number of contiguous sensor outputs indicating movement of the object that is consistent with expected object behavior.

13. The system of claim 7, wherein the vehicle controller is further programmed to, if the probability meets the threshold condition, actuate at least one of a steering actuator, an accelerator actuator, and a brake actuator effective to avoid the object.

* * * * *